April 16, 1957  W. D. ALLISON  2,788,982
TORSIONAL SPRING SUSPENSION FOR MOTOR VEHICLES
Filed Aug. 15, 1952  4 Sheets-Sheet 1
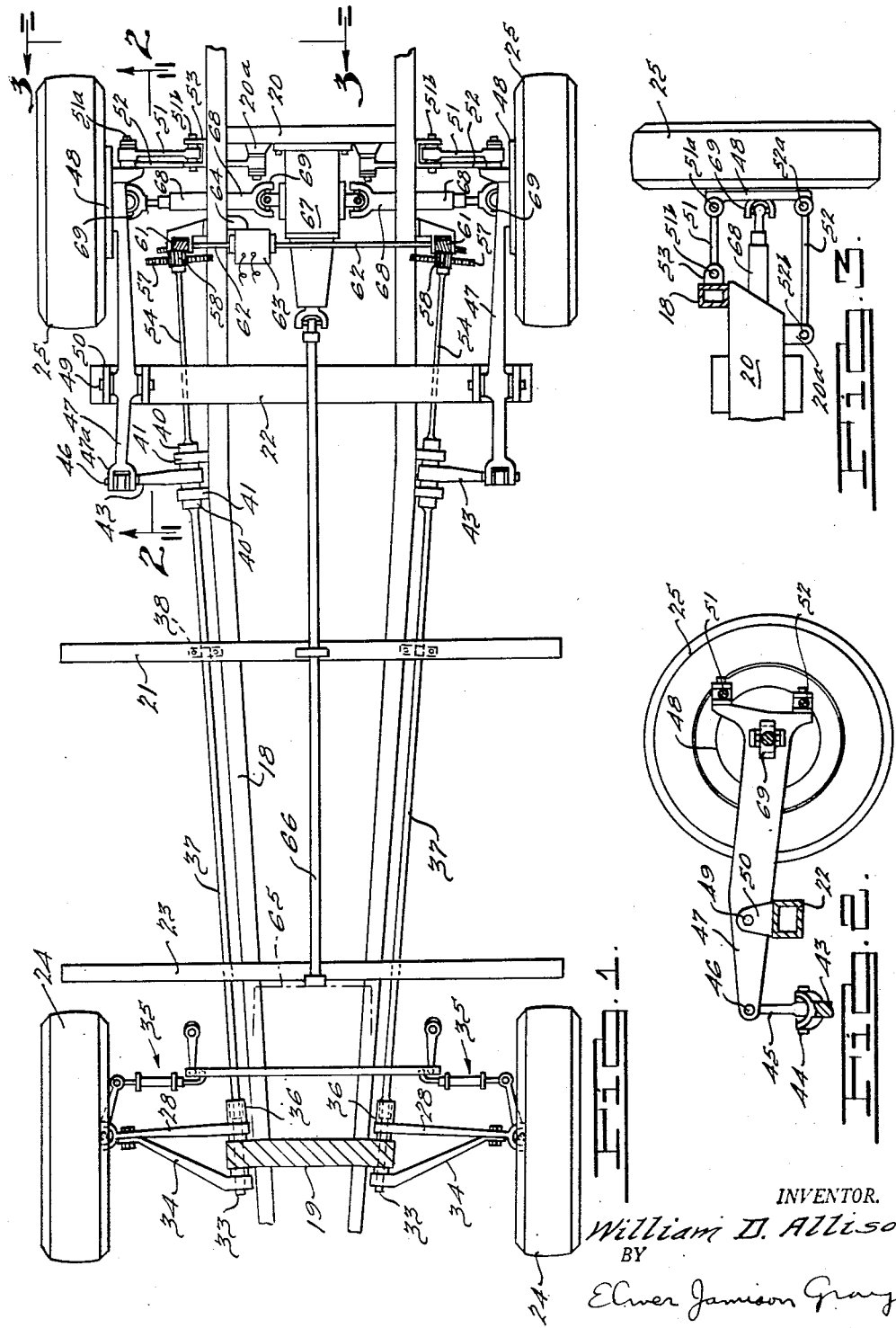
INVENTOR.
William D. Allison.
BY
Elmer Jamison Gray
ATTORNEY.

April 16, 1957 W. D. ALLISON 2,788,982
TORSIONAL SPRING SUSPENSION FOR MOTOR VEHICLES
Filed Aug. 15, 1952 4 Sheets-Sheet 2
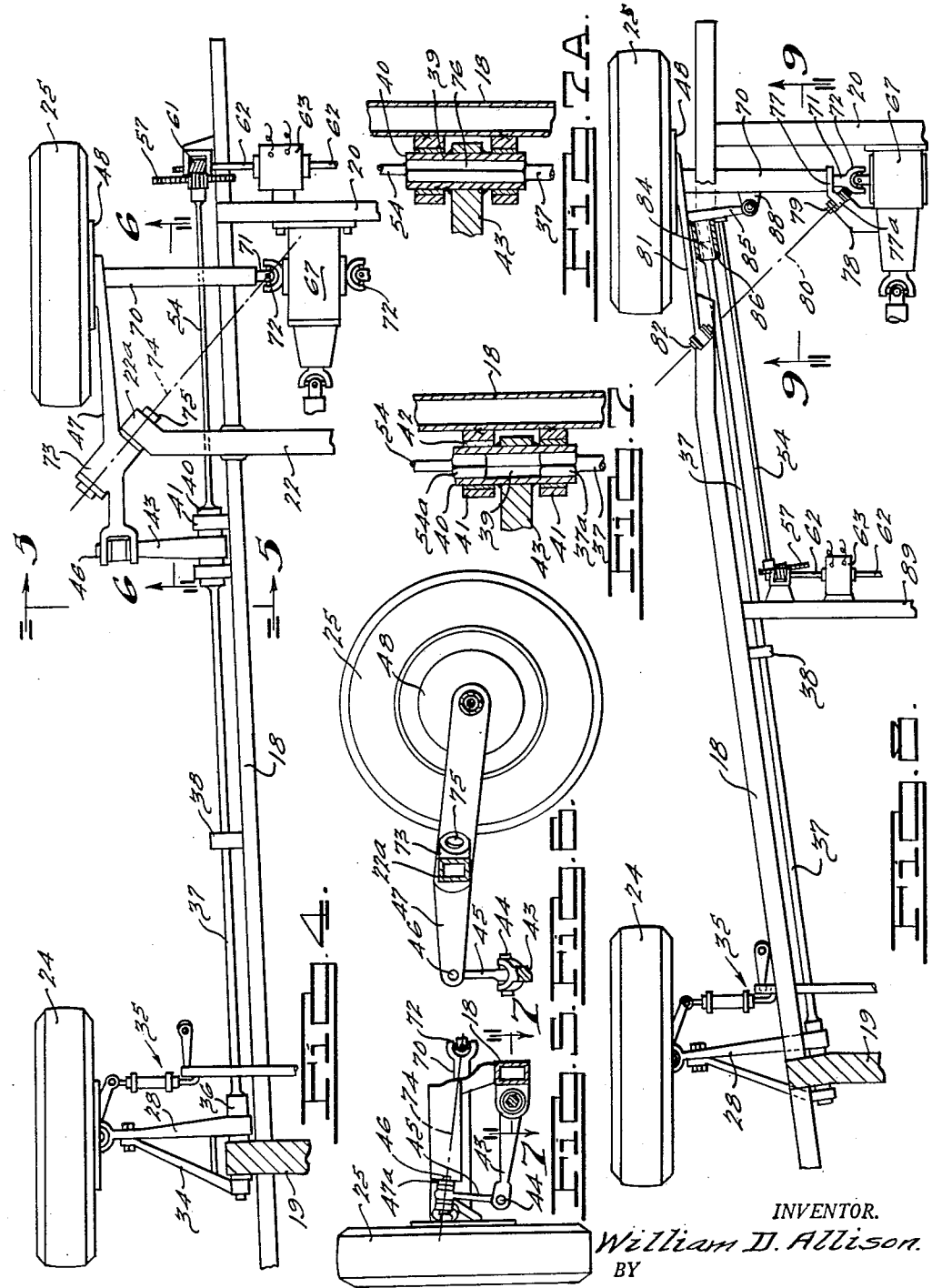
INVENTOR.
William D. Allison.
BY
Elmer Jamison Gray
ATTORNEY.

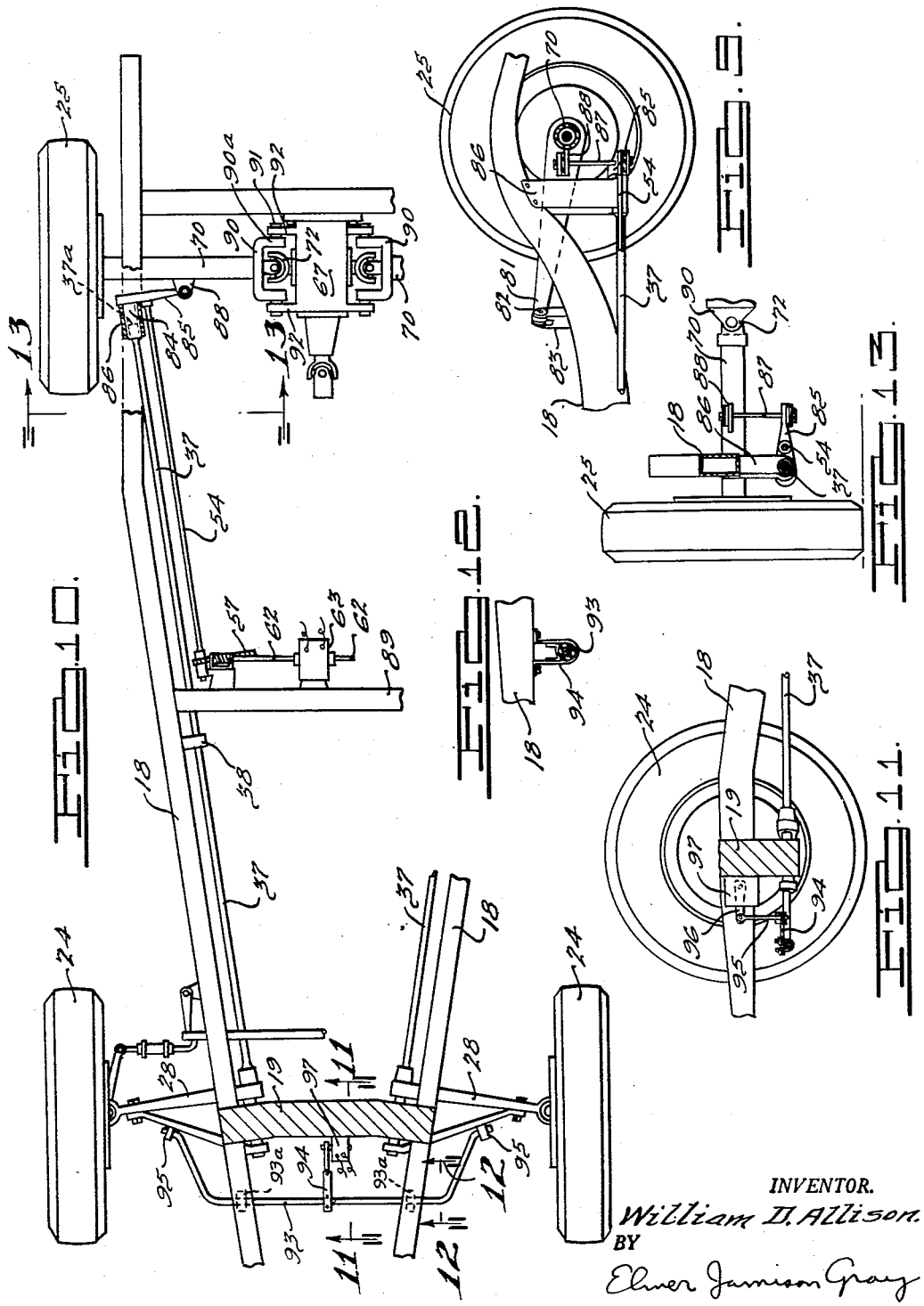

April 16, 1957  W. D. ALLISON  2,788,982
TORSIONAL SPRING SUSPENSION FOR MOTOR VEHICLES
Filed Aug. 15, 1952  4 Sheets-Sheet 4
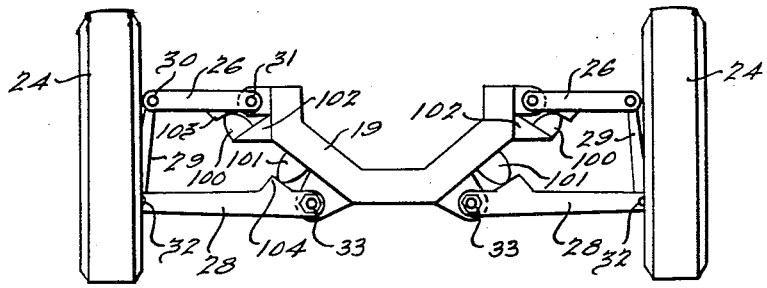
FIG. 14.
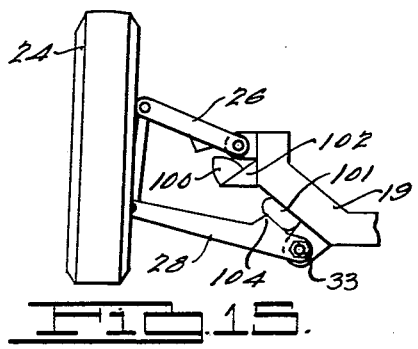
FIG. 15.  FIG. 16.
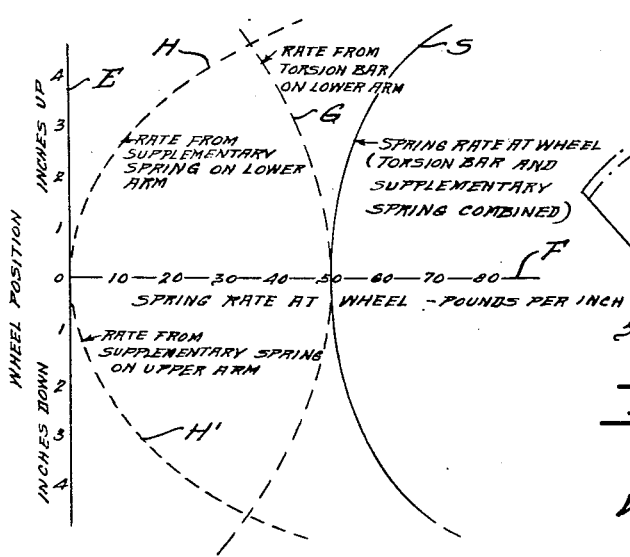
FIG. 17.
FIG. 18.
INVENTOR.
William D. Allison.
BY
Elmer Jamison Gray
ATTORNEY.

United States Patent Office 2,788,982
Patented Apr. 16, 1957

2,788,982
TORSIONAL SPRING SUSPENSION FOR MOTOR VEHICLES

William D. Allison, Grosse Pointe, Mich.

Application August 15, 1952, Serial No. 304,489

13 Claims. (Cl. 280—104)

This invention relates to motor vehicles and particularly to improvements in the spring suspension therefor. The invention is applicable to various types of motor vehicles such as automobiles of the pleasure or passenger types, busses, trucks, ambulances and commercial vehicles. For the purpose of illustration the invention has been shown herein as embodied in a motor vehicle having a chassis adapted to be utilized in a passenger or pleasure type automobile.

One of the principal objects of the present invention is to provide a spring suspension for a motor vehicle capable of improving the riding characteristics of the vehicle, increasing the comfort of the driver and passengers especially when the vehicle travels over rough roads, and rendering the vehicle safer to handle over rough terrain while reducing materially serious stresses to which the frame is subjected in the use of motor vehicles, particularly those equipped with conventional solid axle rear suspensions.

Another important object of the invention is to provide a simplified and improved spring suspension especially advantageous for use in light cars, the invention enabling a light relatively cheap car to be produced which will have riding characteristics at least comparable to or superior to those of relatively heavy, long wheel base cars of expensive makes.

Another object of the invention is to provide an improved spring suspension for a motor vehicle having front and rear wheels comprising a main spring means, preferably torsion bar or torsional spring means, connecting a front and a rear wheel at the same side of the vehicle and adapted to transmit vertical forces in corresponding directions to the vehicle frame adjacent opposite ends thereof in response to vertical motion of either wheel. In addition to the foregoing, the spring suspension comprises a load compensating spring means, preferably of the torsion bar kind, which may be separate from or a continuation of the main spring means and connected to one of the wheels, such as the rear wheel, independently of the front wheel and adapted to be torsionally deflected to vary the spring resistance adjacent an end of the frame so as to compensate for varying loads thereon. As a result of this feature of the invention it is possible to maintain the average effective riding height of the vehicle body substantially constant within the range of the load capacity of the spring suspension regardless of whether the vehicle is empty or whether varying loads are carried thereby. Moreover, by virtue of the main spring suspension which is common to the front and rear wheels much softer or lower rate springs may be utilized, thereby improving the riding qualities of the vehicle.

In the illustrated embodiment of the invention the main torsional spring means, which may be a single torsion bar of solid or tubular construction, is connected directly to the inner end of the lower swinging suspension arm for the front wheel. This bar preferably extends continuously and rearwardly of its connection with the rear wheel at the same side of the vehicle, this construction having the additional advantage of resisting body roll or side sway. The rear end of the main torsional spring means, in the illustrated embodiments, is attached to a swinging lever arm adapted to be swung in opposite directions, preferably up and down, to torsionally twist or deflect the torsional spring means in response to vertical motion of either a front wheel or a rear wheel.

In the illustrated embodiments the rear wheels are shown as independently operable either through the medium of upper and lower parallel suspension arms for each wheel or through the medium of swing axles, frequently termed swinging half axles. In certain embodiments a longitudinally extending lever or torque arm is attached at its rear end to the rear wheel or the axle section associated therewith, this lever or torque arm being pivoted or trunnioned intermediate its ends on the frame and having its forward end connected to the outer end of a swinging lever arm which in turn is attached at its inner end to the main torsional spring means and preferably also to the compensating spring means. In certain other embodiments the rear end of the main torsional spring means, and preferably also the compensating spring means, is connected to the outer end of a swinging lever arm which is pivotally connected at such end to the frame, the inner end of the lever arm being connected to the swinging half axle and thereby responsive to vertical motion of the associated wheel. By virtue of the foregoing construction up and down movement of the rear wheel or wheel axle will torsionally deflect the main torsion spring means in directions opposite to the torsional deflection thereof produced by corresponding up and down movements of the front wheel. The load compensating spring means, which is preferably of the torsion bar kind, extends in certain embodiments longitudinally in line with the main torsion spring means at each side of the vehicle, and one end of the compensating spring means is connected to the same lever arm as the main spring means. In other embodiments the torsional compensating spring means at each side of the vehicle is extended parallel to or alongside the main torsional spring means to a point in advance of the swinging lever arm which is attached in common to the rear ends of the main and compensating spring means. The resistance of the compensating spring means may be increased or decreased in order to compensate for varying static loads on one end of the vehicle, such as the rear end, by means of automatically operable delayed action power driven means.

Where the main torsion bar spring means is connected to the inner end of the lower front wheel suspension arm the spring resistance at the front wheel is variable and has a decreasing rate as the wheel is displaced vertically in either direction from its normal position at which the upper and lower suspension arms for the wheel are disposed in a mean horizontal position. In accordance with the present invention this decreasing spring rate at the front wheel is overcome and a desirable increasing spring rate is achieved by the provision of supplementary spring or yieldable means interposed between each front wheel and the frame. In the embodiments herein illustrated yieldable or resilient abutment elements, preferably of rubber or rubber-like material, are mounted on the frame in position to be engaged by the inner ends of each pair of front suspension arms, the abutment element for the lower suspension arm resisting upward swinging thereof and the abutment element for the upper suspension arm resisting downward swinging thereof. By virtue of this improved construction the supplementary spring or yieldable means functions in conjunction with the main torsion bar spring means to provide a variable increasing rate of spring resistance to the front wheels, the force applied thereby effectively restoring the frame or body to its normal riding height in which the suspension arms are horizontal. At the normal relative positions of the front wheels and the frame or body the supplementary spring or yieldable means exerts no effective resisting or opposing effort against the suspension arms, the resistance effort thereof gradually or progressively building up or increasing at a predetermined rate during vertical displacement of the wheel so as to modify the spring rate of the main torsional spring means and produce in conjunction therewith the optimum variable increasing spring rate. Not only does this spring means have the advantage of building up the spring rate as the front wheels are displaced vertically toward their extreme positions but also function advantageously in resisting body roll or sway during operation of the vehicle.

Other objects of this invention will appear in the following description and appended claims, reference being had to the accompanying drawings forming a part of this specification wherein like reference characters designate corresponding parts in the several views.

Fig. 1 is a fragmentary plan view, partly in section, of a motor vehicle chassis provided with a spring suspension constructed in accordance with one embodiment of the invention.

Fig. 2 is an enlarged fragmentary sectional elevation taken substantially through lines 2—2 of Fig. 1 looking in the direction of the arrows.

Fig. 3 is a fragmentary transverse sectional elevation taken substantially through lines 3—3 of Fig. 1 looking in the direction of the arrows.

Fig. 4 is a fragmentary plan view, partly in section, in part similar to Fig. 1 but illustrating in certain respects modifications of the embodiment of Fig. 1.

Fig. 5 is a fragmentary transverse sectional elevation taken substantially through lines 5—5 of Fig. 4 looking in the direction of the arrows.

Fig. 6 is a fragmentary longitudinal sectional elevation taken substantially through lines 6—6 of Fig. 4 looking in the direction of the arrows.

Fig. 7 is an enlarged fragmentary sectional view taken substantially through lines 7—7 of Fig. 5 looking in the direction of the arrows.

Fig. 7A is a view similar to Fig. 7 but illustrating a modification thereof.

Fig. 8 is a fragmentary plan view, partly in section, and generally similar to Fig. 1 but illustrating certain modifications of the embodiment of Fig. 1.

Fig. 9 is a fragmentary longitudinal sectional elevation taken substantially through lines 9—9 of Fig. 8 looking in the direction of the arrows.

Fig. 10 is a fragmentary plan view, partly in section, and generally similar to Fig. 1 but illustrating certain modifications of the embodiment of Fig. 1.

Fig. 11 is a longitudinal fragmentary sectional elevation taken substantially through lines 11—11 of Fig. 10 looking in the direction of the arrows.

Fig. 12 is a fragmentary longitudinal sectional elevation taken substantially through lines 12—12 of Fig. 10 looking in the direction of the arrows.

Fig. 13 is a fragmentary transverse sectional elevation taken substantially through lines 13—13 of Fig. 10 looking in the direction of the arrows.

Fig. 14 is a front end elevation applicable to each of the embodiments, parts being removed for the purpose of clearness.

Fig. 15 is a view, in part similar to Fig. 14, illustrating the action of the variable rate spring or resilient means when a front wheel is elevated.

Fig. 16 is a view, in part similar to Fig. 14, illustrating the action of the variable rate spring or resilient means when a front wheel is depressed.

Fig. 17 is an enlarged fragmentary transverse sectional elevation illustrating the mechanism for torsionally deflecting the load compensating spring means for each of the embodiments of the invention.

Fig. 18 is a graph illustrating the spring rate both individually and combined of the supplemental spring means of Fig. 14 and the main torsional spring means.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the accompanying drawings, there is illustrated, by way of example, a vehicle chassis having road wheels supporting the frame or body through the medium of a spring suspension which, in the several embodiments, is preferably of the torsional or torsion bar kind. In the interest of clarity the vehicle super-structure or body and details of the power plant and driven mechanisms have been largely omitted in the drawings.

As illustrated in the drawings, the chassis or body frame is shown, by way of example, as comprising spaced longitudinal sills or frame members 18 of box-like tubular construction rigidly connected together by means of a main drop type front cross member 19 (see Fig. 14). The longitudinal frame members are also rigidly connected together by suitable cross frame members such as the rear cross member 20 and intermediate cross members 21, 22 and 23 shown in the embodiment of Fig. 1. The vehicle is provided with a pair of front dirigible wheels 24 and a pair of rear driven wheels 25.

Each front wheel 24 is supported in generally conventional manner by means of upper and lower swinging suspension arms or levers which are preferably of wish bone construction. Referring to Fig. 14, the upper relatively short suspension arms are indicated at 26 and the relatively long lower suspension arms for the front wheels are indicated at 28. The upper and lower suspension arms 26 and 28 for each front wheel are mounted transversely to the longitudinal axis of the vehicle for swinging movement in a substantially vertical plane and are joined together at their outer ends by spindle and king pin mounting 29 of suitable type. The outer end of each upper suspension arm 26 is pivoted at 30 to the spindle and king pin carrier 29 and the inner end of each suspension arm 26 is pivoted at 31 to the cross frame member 19, see Fig. 14. The outer end of each lower suspension arm 28 is pivoted at 32 to the spindle carrier 29 and the inner end is pivotally mounted at 33 upon the cross member 19. The main lower suspension arm 28, as shown in Fig. 1, is braced by means of a brace bar 34 which may be detachably bolted to the arm 28. The inner ends of the members 28 and 34, forming the lower suspension arm unit, are pivotally mounted upon a shaft or spindle 33 extending through the cross frame member 19 and rigidly secured to the latter, as by welding. Suitable bearings are interposed between the inner ends of the arm members 28, 34 and pivot shaft 33, thus permitting each lower suspension arm to swing up and down in response to up and down motion of the associated front wheel.

Steering control is provided at the front wheels 24 through the spindle and king pin mountings or carriers 29 by any conventional independent type of steering mechanism, such as that generally illustrated, by way of example, at 35 in Fig. 1.

Rigidly secured, as by welding, to the inner end of each lower suspension arm 28 is a sleeve 36 formed interiorly thereof with a squared or hex socket into which the forward enlarged squared or hex end of a main torsion bar 37 has a sliding fit. Thus, the front end of each torsion bar 37 is keyed to the sleeve 36 which in turn is rigidly secured to the lower suspension arm 28 at the axis of swinging thereof. In the present embodiments each main longitudinal torsion bar 37 extends from the sleeve 36 rearwardly alongside one of the main longitudinal frame members 18. Intermediate the length thereof each main torsion bar 37 may extend through and be guided by rubber bushings mounted within a bracket 38 detachably secured either to the cross frame member 21 in Fig. 1 or the adjacent longitudinal frame member 18 in Figs. 4, 8 and 10.

Referring particularly to Figs. 1 and 7, the rear end of each main torsion bar 37 is formed with an enlarged hex portion 37a which has a sliding fit within a correspondingly shaped socket 39 extending from one end to the other in a sleeve 40. This sleeve is rotatably mounted or journalled within spaced brackets 41 through the medium of suitable bushings 42, the brackets being rigidly secured to the adjacent frame member 18, as by welding. A laterally-extending lever arm 43 for each rear wheel 25 has an opening at its inner end through which the sleeve 40 extends, the sleeve being rigidly secured to the lever arm, as by welding.

It will be seen that the lever arm 43 for each rear wheel extends outwardly from the longitudinal axis of the associated main torsion bar 37. The outer end of each lever arm 43 is bifurcated, see Fig. 2, and pivotally connected at 44 to the lower end of a vertically extending connecting rod or link 45. Rubber bushings are preferably interposed between the link 45 and lever arm 43 to provide a flexible pivotal connection at 44. The upper end of the link or connecting rod 45 is pivotally connected at 46 to the forward bifurcated end 47a of a swinging rear wheel support or torque arm or lever 47. A suitable rubber bushing is preferably interposed between the lever 47 and the upper end of the link 45 to provide a flexible pivotal connection at 46.

The wheel support lever or torque arm 47 for each rear wheel 25 is rigidly attached at its rear end to a rear wheel support and spindle member 48. Each lever or torque arm 47 is fulcrumed or pivoted intermediate its ends at 49 to a bifurcated bracket 50 rigidly attached to an end of the cross frame member 22.

In the embodiment of Fig. 1 each rear wheel 25 is independently supported for up and down motion by means of upper and lower short and long swinging suspension arms or levers of a kind generally similar to the suspension arms for each front wheel. Referring to Fig. 3, the upper relatively short suspension arm for each rear wheel is indicated at 51 and the relatively long lower suspension arm for each rear wheel is indicated at 52. The outer end of each upper suspension arm 51 is pivoted at 51a to the wheel support 48, and the inner end is pivoted at 51b to a bracket 53 rigidly attached to the frame member 18. The outer end of each lower suspension arm 52 is pivoted at 52a to the wheel support 48 and the inner end is pivoted at 52b to a bracket 20a rigidly attached to the cross frame member 20.

In the present embodiments of the invention each main torsion bar 37 is supplemented at the rear of the vehicle by means of compensating spring means at each side of the vehicle for the purpose of additionally springing the rear wheels and providing means for compensating for varying static loads. The compensating spring means for each rear wheel preferably comprises a torsion bar, although it will be understood that one or a plurality of torsion bars may be provided for each rear wheel. The compensating torsion bars, as in the case of the main torsion bars 37, are selected as to cross sectional size and torsional characteristics to suit the particular vehicle, and in each embodiment the compensating torsion bar is of less diameter or cross sectional size than the associated main torsion bar so as to exert appreciably less torsional resistance than the main torsion bar. The compensating torsion bars for the rear wheels in the several embodiments function to increase or decrease the spring resistance at the rear wheel so as to maintain the rear end of the vehicle at a substantially constant average riding height and in like manner to maintain the front end of the vehicle at a substantially constant average riding height. In preferred practice the compensating torsional spring means may be torsionally deflected in one direction to supplement the main torsional spring means and increase the torsional effort or spring resistance applied to the rear wheels or may be deflected in the opposite direction either to decrease the spring resistance at the rear wheels or reduce the torsional effort exerted by the main torsional spring means. The load compensating spring means is shown in the present embodiments for the rear end of the vehicle only since in present day automobiles most of the passenger and baggage loads are concentrated at the rear. However, it will be understood that where loads are distributed substantially evenly to the front and rear wheels the compensating spring means may be duplicated for the front wheels and operated in the same manner as hereinafter described.

In the embodiment of Fig. 1 the compensating spring means comprises torsion bars 54, one being provided at each side of the vehicle for each rear wheel. Each load compensating bar 54 is preferably of appreciably less diameter than the associated main torsion bar 37 and extends in alignment therewith toward the rear of the vehicle. As illustrated in Figs. 1 and 7, each compensating torsion bar 54 is provided at its forward end with an enlarged hex portion 54a having a snug sliding fit within the correspondingly shaped socket 39 in the rear end of the sleeve 40. It will thus be seen that the main and supplementary torsion bars 37 and 54, respectively, extend end to end and in alignment, and adjacent ends thereof are keyed within a common sleeve or tubular member 40 which is rigidly secured to the inner end of one of the up and down swinging lever arms 43.

As shown particularly in Fig. 17, the rear end of each compensating torsion bar 54 is formed with an enlarged hex portion 54b having a snug sliding fit within a correspondingly shaped hex socket 55a in a sleeve or socket member 55. This socket member is rotatably mounted within a bearing in the lower end of a bracket 56 bolted to the adjacent frame member 18. The lower hub portion of a sector gear 57 is rigidly attached, as by welding, to the socket member 55. Meshing with the teeth of the gear 57 is a pinion 58 which is integral with a larger worm gear 59. The reduction gear unit 58, 59 is rotatably mounted upon a shaft 60 journalled in the upper portion of the bracket 56. This bracket terminates at its upper end in a bifurcated portion 56b receiving a worm 61 meshing with the teeth of the worm gear 59. The worm 61 is attached to a shaft 62 driven by a small reversible electric motor 63 carried by a bracket 64 (Fig. 1) attached to the frame member 18. It will be understood that an operating unit, including gears 57, 59, worm 61 and shaft 62, is provided for each compensating torsion bar 54 at each side of the vehicle and each operated from the electric motor 63. Since the worms 61 of the operating units for the two compensating bars 54 have oppositely directed teeth, sector gears 57 will be rotated in opposite directions upon operation of the motor 63 in one direction or the other. Operation of the electric motor 63, through power supplied from the battery of the vehicle, will, through the operating units, turn the sleeves 55 in opposite directions, and since these sleeves are splined or keyed to the rear ends of the torsion bars 54, the latter will be torsionally deflected or twisted in one direction or the other. The worms 61 meshing with the worm teeth on the gears 59 provide a self-locking construction in which the sector gears 57 are locked in any angularly adjusted position thereof. As a result of this construction the compensating torsion bars 54 may be simultaneously adjusted torsionally in opposite directions in a positive manner to any degree of deflection desired and will be maintained in every adjusted position by the self-locking worms 61.

The reversible electric motor 63 may be automatically actuated in response to changes in static load on the rear of the vehicle by a delayed action limit switch mechanism and wiring circuits (not shown herein), or this motor may be operated in either direction by a switch conveniently mounted on the instrument panel of the vehicle. For automatic operation the delayed action limit switch mechanism may be similar to that shown and described in my application Serial No. 757,579, now Patent No. 2,607,611, dated August 19, 1952. The switch mechanism may be controlled from the rear of the vehicle as in my said application or from the front of the vehicle as illustrated in Figs. 10 and 11.

As illustrated by way of example in Fig. 1, the rear wheels may be driven through the medium of a suitable engine 65 at the front of the vehicle. The engine drives a propeller shaft 66 which is connected at the rear end thereof to the differential mechanism carried by a casing 67 mounted upon the frame. Vertically oscillatable drive shafts 68 are connected through universal joints 69 to the differential mechanism and driven wheels 25. In the embodiment of Fig. 1 it will be noted that the load compensating spring means 54 and operating mechanism therefor, including the reversible electric motor 63, are mounted in advance of the driving shafts or axle members 68.

From the foregoing it will be seen that up and down motion of the rear wheels 25 will result in rocking or swinging the wheel supporting levers or torque arms 47 about a common transverse pivotal axis extending through the pivots 49 of the levers on the frame cross member 22. The forward ends of the levers 47 will move vertically in directions opposite to the wheels 25 and this vertical motion of the forward ends of these levers will be transmitted through the connecting links 45 to the lever arms 43, thereby swinging or rocking the same up and down about the inner pivotal axes thereof extending through the tubular sleeves 40. As a result of the up and down motion of each lever arm 43, the torsional deflection of the associated torsion bars 37 and 54 will be varied, thereby varying the spring resistance at the rear wheel. Since the main torsion bars 37 are common to the front and rear wheels it will be apparent that the spring rate of these torsion bars will be substantially half the spring rates required for conventional vehicles having independent springs for all four wheels.

Since the forward ends of the main torsion bars 37 are attached to the inner ends of the lower suspension arms 28 for the front wheels, it will be apparent that up and down motion of these wheels will result in torsionally deflecting the bars 37 in opposite directions. Although the levers or arms 28 and 43 attached to opposite ends of each torsion bar 37 extend outwardly from the torsion bar in the same direction, it will be noted that up and down movement of a rear wheel will torsionally deflect the main torsion bar 37 in directions opposite to the torsional deflection thereof produced by corresponding up and down movements of the front wheel at the same side of the vehicle. As a consequence, either arm or lever 28 or 43 is effective to torsionally deflect the torsion bar 37 in opposition to the other arm or lever, thereby to transmit vertical forces in corresponding directions to the frame at opposite ends thereof in response to vertical motion of either wheel. Thus, when a rear wheel 25 is displaced upwardly, thereby tending to elevate the rear end of the frame, the rear end of the bar 37 will be twisted in a direction so as to exert a force tending to swing the front suspension arm 28 downwardly and depress the front wheel. Since the outer end of the suspension arm 28 is held against downward movement by the front wheel the net result is to raise the front end of the frame in a direction corresponding to the direction in which the rear end of the frame is raised by the upward movement of the rear wheel. The reverse operation occurs when the front wheel is displaced vertically relatively to the rear wheel at the same side of the vehicle.

From the foregoing it will be seen that both front and rear ends of each torsion bar spring 37 will be simultaneously deflected or twisted substantially in corresponding amounts when the front and rear wheels successively pass over a change in elevation, resulting in substantially equivalent vertical movements in the same directions being transmitted to opposite ends of the vehicle body and chassis. The main torsion bar spring suspension, therefore, simultaneously imparts vertical forces in corresponding directions adjacent the front and rear of the vehicle body or frame in response to vertical motion of either a front wheel or a rear wheel. As a consequence, the spring suspension will tend to maintain the chassis and vehicle body substantially level regardless of vertical movements of the front and rear wheels. Of course, it will be understood that when the front and rear wheels are simultaneously elevated both ends of the vehicle chassis and body will be raised substantially equal distances. When one front wheel is elevated and a rear wheel is lowered simultaneously, assuming the distances of elevation are equal, there will be substantially no change in lift to the vehicle sprung weight. It is important to note that the total vertical forces due to a change in elevation of either front or rear wheel at one side of the vehicle is absorbed by and divided equally between the front and rear of the interconnecting torsion bar 37. Thus, the average spring rate of the present spring suspension will be approximately one-half of the spring rate of a conventional automobile.

An important purpose of the load compensating torsion bars 54 is to increase or decrease the total load resistance of the spring suspension at the rear of the vehicle so as to compensate for increases or decreases in the total load applied at the rear of the vehicle. In order to enable the use of compensating bars 54 of minimum diameter and also to avoid any condition in which the rear end of the frame rides either above or below the normal riding height thereof, the operating means for the compensating bars is preferably constructed so as to enable each compensating torsion bar to be torsionally twisted or deflected in one direction so as to act in opposition to the associated main torsion bar when there is no load on the rear end of the vehicle additional to the normal sprung weight thereof. The main torsion bars 37, therefore, may be selected as to diameter and torsional spring capacity so as to carry a predetermined static load at the rear of the vehicle greater than the normal sprung weight thereof. When such static load is not present and the vehicle is empty the main torsion bars would elevate the rear end of the vehicle above its normal riding height. Under such condition the compensator bars 54 are torsionally adjusted in opposition to the bars 37 so as to displace the rear end of the frame downwardly and dispose it at its normal riding height. Thus, when the sprung weight of the vehicle and the predetermined additional load thereof equal the resistance of the main torsion bars, the compensator bars will be entirely unstressed. Thereafter, as the static load at the rear of the frame increases, the compensator bars may be torsionally adjusted through operation of the electric motor 63 so as to supplement the resistance of the main torsion bars and thereby increase the spring resistance so as to maintain the rear end of the vehicle at its normal riding height. The construction is such, therefore, that the compensator bars 54 may be positively torsionally adjusted in opposite directions.

Figs. 4 to 6 illustrate certain modifications of the embodiment of the invention illustrated in Figs. 1 to 3. Although the spring suspension and associated structure at only one side of the vehicle is shown in Fig. 4 it will be understood that the same construction is provided at the opposite side. In this embodiment the rear wheels 25 are supported for independent vertical motion through the medium of swinging half axles or swing axles 70, each carrying a wheel driving shaft 71 connected through a universal joint 72 to the rear differential mechanism 67. Each swing axle 70 is rigidly attached to the wheel support 48 and is capable of up and down motion with the wheel. The torque arm 47 for each rear wheel, which functions similarly to the torque arm 47 of Fig. 1, is attached to the wheel support 48. However, in Figs. 4 to 6 the torque arm 47 is provided intermediate its ends with an enlarged bearing boss or sleeve 73 extending obliquely with respect thereto and having a bore whose axis 74 extends at an oblique angle through the center of the universal joint 72. The bearing boss 73 is pivotally mounted on an angular offset portion 22a of the cross frame member 22 through the medium of a pivot shaft or spindle 75 extending through the aligned bores in the portions 73 and 22a.

The forward end of each torque arm 47 is connected to the lever arm 43 through vertical link 45 in the same manner as in the embodiment of Fig. 1, this construction being illustrated in Figs. 5 and 6. Since the pivot shaft 75 is inclined to the horizontal to cause the axis 74 thereof to extend at an inclination through the center of the universal joint 72 (see Fig. 5) the pivot 46 for the forward end of torque arm 47 is correspondingly inclined and hence the connecting rod or link 45 is inclined outwardly as shown in Fig. 5 and pivotally connected at 44 to the outer end of lever arm 43 as previously described. From the foregoing it will be seen that each rear wheel will be effectively controlled for vertical motion by the swing axle 70 and torque arm 47 and will swing about the oblique inclined axis 74.

In the embodiment of Fig. 4 the main and compensating torsional spring means for the wheels and the operation thereof are the same as in Fig. 1 excepting that in Fig. 4 the compensating bar 54 extends to a point rearwardly of the half axle 70 and cross frame member 20. The operating mechanism for the compensating torsion bars 54 in Fig. 4 is the same as previously described and particularly shown in Fig. 17, the compensating motor 63 in Fig. 4 being, however, mounted on the cross frame member 20. Other than the differences above described the embodiment of Figs. 1 and 4 are substantially the same.

Although the corresponding ends of the main torsion bar 37 and compensating torsion bar 54 in each of the embodiments of Figs. 1 and 4 are preferably connected through sleeve 40 to the lever arm 43 as illustrated in Fig. 7, it will be understood that the modified construction shown in Fig. 7a may be utilized. In this latter figure the bars 37 and 54 at each side of the vehicle are integral, i. e. they are formed from a single length of bar stock with the compensating bar 54 preferably reduced appreciably in diameter. The bar stock from which bars 37 and 54 are fabricated is formed with an elongate hex portion 76 fitting within the correspondingly shaped socket 39 in the sleeve 40. Thus, in Fig. 7a the main and compensating torsion bars 37 and 54 respectively are connected through a common hex portion 76 to the sleeve 40 and hence to the lever arm 43. The operation, however, is identical to that where the construction of Fig. 7 is utilized.

In the embodiment of Figs. 8 and 9 the rear wheels, as in Fig. 4, are supported for independent vertical motion by swing axles 70. The drive shaft 71 carried by each swing axle is also connected at its inner end to the differential by a universal joint 72. However, in this embodiment the inner end of each axle 70 is supported by a yoke 77 attached thereto and provided with an angular extension 77a pivoted through a pivot pin 79 to a bracket 78 attached to the differential housing or a portion of the vehicle frame. Thus, the inner end of each swing axle 70 pivots about an oblique as well as an upwardly and outwardly inclined axis 80 passing through the pivot 79. In addition to the swing axle 70 each rear wheel 25 is also controlled for vertical motion by a torque arm 81 attached at its rear end to the wheel support 48 to which the swing axle is also attached. Each torque arm 81 extends forwardly from the wheel and also inclines upwardly and inwardly, and the forward end thereof is pivoted at 82 to the upper end of a bracket 83 attached to the adjacent frame member 18. To provide for this construction the side frame members 18 diverge from front to rear a greater degree than in Fig. 1. The pivotal axis at 82 of the forward end of each torque arm 81 extends obliquely and inclines rearwardly and downwardly and is coincident with the axis 80.

From the foregoing it will be seen that each rear wheel 25 in the embodiment of Figs. 8 and 9 will be effectively controlled for vertical motion by the swing axle 70 and torque arm 81 and will swing about the oblique inclined axis 80 in a manner similar to the operation in Fig. 4.

In the embodiment of Figs. 8 and 9 the rear enlarged hex end 37a of each main torsion bar 37 (which is extended rearwardly in this instance to a point adjacent the swing axle 70) fits within a hex socket in a sleeve 84 rotatable within a bearing in the lower end of a bracket 86 attached to and depending from the frame member 18 (Fig. 9). The sleeve 84 to which torsion bar 37 is keyed is in turn attached to the outer end of a swingable lever arm 85. The inner end of this lever arm is connected to the lower end of a hanger link or rod 87, and the upper end of rod 87 is connected to a bracket 88 rigidly secured to the swing axle 70. The connections at opposite ends of rod or link 87 embody rubber or resilient material to provide for the required amount of flexibility at these points. Vertical motion of each rear wheel and swing axle 70 will thus swing the lever arm 85 on its pivotal bearing in the lower end of frame bracket 86 and this operation will result in torsionally deflecting or twisting the rear end of torsion spring bar 37 in one direction or the other. Since the lever arm 85 extends in a direction opposite to or opposed to lever 28 to which the front end of torsion bar 37 is attached (as previously described in connection with the embodiment of Fig. 1) it will be understood that lever arms 28 and 85 will torsionally deflect or twist torsion bar 37 in opposite directions in response to corresponding vertical motions of the front and rear wheels. The operation is therefore the same as described in connection with Fig. 1.

In the embodiment of Figs. 8 and 9 each compensating spring torsion bar 54 extends parallel to and alongside the rear portion of bar 37, and the rear end of bar 54 is splined or keyed into a socket in lever arm 85 so as to be torsionally deflected or twisted upon swinging motion of lever 85. The forward end of each compensating bar 54 in Figs. 8 and 9 is connected to operating mechanism, such as shown in Fig. 17, for torsionally deflecting the same in response to variations in static load at the rear of the frame. The automatic mechanism for varying the torsional resistance of bars 54 in Figs. 8 and 9 is, therefore, the same and functions the same as previously described in connection with the embodiment of Fig. 1. In this instance, however, it acts upon the forward ends of the compensating bars and is mounted on a frame cross member 89. As in the previous embodiments the compensating torsion bars function to modify the spring resistance at the rear of the vehicle and may either oppose the resistance of the main torsion bars or provide additional spring resistance, depending upon the static load at the rear of the vehicle.

The embodiment in Figs. 10 to 13 is the same as in Figs. 8 and 9 with the exception that the torque arms 81 and the supporting members 77 and 78 for the inner ends of the swing axles 70 are omitted. In Fig. 10 the inner end of each swing axle 70 is rigidly secured to a yoke 90 having arms 90a extending at opposite sides of the universal joint 72. These arms are pivoted at 91 to lugs 92 projecting from the differential housing 67. Thus, each yoke 90 controls up and down motion of each rear wheel in a vertical plane substantially perpendicular to the longitudinal axis of the vehicle. This motion, as in previous embodiments, is transmitted to the main torsion bar 37 and the compensating torsion bar 54 which are torsionally deflected or twisted in one direction or the other consequent to vertical displacement of the rear wheels.

As previously stated the compensating reversible electric motor 63 may be automatically actuated through delayed action limit switch mechanism similar to my above referred to application Serial No. 757,579. In Figs. 10 and 11 this switch mechanism is controlled at the front of the vehicle, such as from the conventional sway bar 93 which extends transversely of the frame members 18 and is connected thereto at 93a and also to the lower wheel suspension arms at 95. Vertical displacement of the front end of the frame in one direction or the other, consequent to an opposite vertical displacement of the rear end of the frame, as hereinafter described, will be imparted to the sway bar 93. Rigidly attached to this sway bar is an arm 94 connected at its rear end to a vertical link or rod 95 pivotally connected at its upper end to a vertically swingable lever 96. This lever is connected to the delayed action switch within box 97. Upward or downward displacement of the lever 96 consequent to a prolonged change in elevation of the front end of the frame, as when a change in pay load or static load occurs at the rear of the vehicle, will actuate the delayed action switch in switch box 97. This switch, being electrically wired to motor 63, will actuate the same in one direction or the other and thereby cause the compensating torsion bars 54 to be twisted or torsionally deflected in one direction or the other to levelize the frame.

It will be understood that where the spring suspension, comprising torsional springs 37, is common to the front and rear wheels, and provides a balanced spring suspension, as in the present embodiments of the invention, a change in static or pay load at one end of the frame or body, such as at the rear end, will effect a relative change in elevation of the front and rear of the frame. For example, the addition of passengers or baggage at the rear of the vehicle will lower the elevation of the rear of the frame and body and raise or elevate the front end. In such instance the sway or stabilizer bar 93 will be elevated, thereby through arm 94, link 95 and lever 96 actuating the delayed action switch 97 after a predetermined interval of time and hence actuating motor 63 to wind up or increase the torsional deflection of the compensating springs 54 and increase the spring resistance at the rear of the vehicle so as to elevate the same and at the same time lower the elevation of the front end of the frame. When the frame becomes level the switch 97 is cut off and the motor 63 stopped leaving the vehicle at an even keel with a constant road clearance regardless of the additional pay load at the rear. The reverse of the foregoing will also occur in the event of an increase in static load at the front of the frame resulting in depressing the same and elevating the rear of the frame.

It will be noted that the main load on the front end of the vehicle is carried by the main torsional springs 37 splined into the inner ends of the lower suspension levers or arms 28 for the front wheels. Since the lower suspension arms 28, as in conventional practice, are longer than the upper suspension arms or levers 26, the effective spring rate at the front wheels from the torsion bars 37 progressively diminishes as the wheels are displaced up or down from their normal positions, this being due to the increasing angularity of the shorter upper arms as compared with the lower arms. This decreasing spring rate is overcome in accordance with the several embodiments of the invention by providing supplementary spring or yieldable means which applies forces tending to restore the suspension arms to their normal positions whenever the arms swing vertically away from their normal positions. It will be understood that this decreasing spring rate has the undesirable effect of tending to cause the front end of the vehicle, upon vertical displacement of the wheels, to remain above or below the desired normal riding height at which the front suspension arms extend horizontally. Thus, a relatively slow or sluggish recovery of the vehicle and wheels to their normal relative position results.

Referring to Figs. 14 to 16 the supplementary spring means in the present instance takes the form of yieldable rubber bumpers or abutments 100 and 101 cooperable respectively with the upper and lower suspension arms 26 and 28. Each bumper or abutment 100 is attached to a bracket 102 secured to frame member 19 and is positioned for engagement by a wedge-shaped or tapered projection 103 on the under side of suspension arm 26. Each bumper or abutment 101 is attached to frame member 19 and positioned for engagement by a wedge-shaped or tapered projection 104 on the upper side of suspension arm 28. The yieldable blocks 100 and 101 are preferably semiovoid or tear-drop in shape, increasing progressively in thickness from their outer ends of contact with the members 103 and 104 so as to provide increasing resistance to vertical motion of the suspension arms. Upon elevation of a front wheel, as shown in Fig. 15, abutment member 104 on the lower suspension arm 28 will engage and compress rubber element 101; and upon depression of a front wheel, as shown in Fig. 16, abutment member 103 on the upper suspension arm 26 will engage and compress rubber element 101. The composition of the rubber elements 100 and 101, and the size and dimensions thereof, will be such as to produce the desired variably increasing resistance or spring rate at the wheel. It will be noted that a restoring force or effort is exerted by the supplementary spring elements 100 and 101 only upon a change in elevation of the front wheel, and is greatest upon maximum elevation or depression of the wheel. In addition to assisting in restoring the body and wheels to their normal relative positions the supplementary springs also effectively resist body roll or sway.

Fig. 18 illustrates graphically the individual and combined spring rates of the torsion bar 37 and supplementary spring means 100 and 101. The coordinate line E indicates by numerals associated therewith the normal wheel position at zero and the up and down positions thereof in inches. The coordinate line F indicates the spring rates at the front wheel in pounds per inch. In the normal wheel position the spring rate from torsion bar 37 is represented; by way of example, as being fifty pounds. The variable decreasing spring rate from the torsion bar is indicated by the curved graph line G. The variable increasing spring rate from the supplementary spring 101 on the lower arm 28 is represented by the graph line H and the variable increasing spring rate from the supplementary spring 100 on the upper arm 26 is represented by the graph line H'. The combined spring rate at the wheel from the torsion bar and supplementary spring means may be represented by the graph line S, and it will be seen that this rate is variable and progressively increasing as the wheel moves up and down toward either of its extreme positions. As a consequence, the spring resistance at each front wheel builds up or increases rapidly from the normal wheel position, and due to this fact a fast recovery of the vehicle body and wheel to their normal relative positions is achieved.

I claim:

1. In a vehicle having a vehicle structure and front and rear wheels, a torsional spring suspension common to said front and rear wheels and extending longitudinally of the vehicle structure, separate lever means operatively connecting said suspension to each wheel and acting on said suspension to effect displacement of opposite ends of the vehicle structure in corresponding directions upon vertical motion of a front wheel or a rear wheel, the connection between one lever means and the wheel comprising a longitudinally extending swinging lever, vertically swingable axle means for the rear wheel pivotally mounted inwardly of the wheel, said longitudinally extending lever being pivotally connected intermediate its ends to the vehicle structure to swing about an axis extending substantially through the pivotal mounting of said axle means.

2. A structure as set forth in claim 1 in which load compensating spring means is provided for one wheel, and means operatively connected thereto for deflecting the same thereby to vary the spring resistance at one end of the vehicle structure.

3. In a vehicle having a vehicle structure and front and rear wheels, a torsional spring suspension common to said front and rear wheels and extending longitudinally of the vehicle structure, separate lever means operatively connecting said suspension to each wheel and acting on said suspension to effect displacement of opposite ends of the vehicle structure in corresponding directions upon vertical motion of a front wheel or a rear wheel, vertically swingable axle means for one wheel pivotally mounted inwardly of the wheel, one of said lever means comprising a swingable transversely extending lever arm having one end connected to the axle means in vertically spaced relation thereto and pivotally connected at the opposite end to the vehicle structure.

4. In a vehicle having a vehicle structure and front and rear wheels, a torsional spring suspension common to said front and rear wheels and extending longitudinally of the vehicle structure, separate lever means operatively connecting said suspension to each wheel and acting on said suspension to effect displacement of opposite ends of the vehicle structure in corresponding directions upon vertical motion of a front wheel or a rear wheel, vertically swingable axle means for one wheel pivotally mounted inwardly of the wheel, one of said lever means comprising a swingable transversely extending lever arm connected at its inner end to the axle means and pivotally connected at its outer end to the vehicle structure at the locality of its connection to said suspension, and load compensating torsional spring means connected to said lever arm and adapted to be torsionally deflected thereby.

5. A structure as set forth in claim 3 in which a longitudinally extending torque arm is connected to said one wheel and is pivotally connected to the vehicle structure to swing about an axis extending substantially through the pivotal mounting of said axle means.

6. A structure as set forth in claim 4 in which a longitudinally extending torque arm is connected to said one wheel and is pivotally connected to the vehicle structure to swing about an axis extending substantially through the pivotal mounting of said axle means.

7. In a vehicle having a vehicle structure and front and rear wheels, upper and lower swingable lever arms supporting the front wheel on said structure, a torsional spring suspension common to said front and rear wheels and extending therebetween longitudinally of the vehicle structure, connecting means for connecting said torsional suspension to one of said lever arms, a swingable lever arm connecting said suspension to the rear wheel, said lever arms for the front and rear wheels acting on said suspension to effect displacement of opposite ends of the vehicle structure in corresponding directions upon vertical motion of a front wheel or a rear wheel, and supplemental spring means operative upon vertical motion of said first named lever arms and independently of said connecting means for modifying the action of said spring suspension and providing in conjunction therewith a variable spring rate at the front wheel.

8. In a vehicle having a vehicle structure and front and rear wheels, upper and lower swingable lever arms supporting the front wheel on said structure, a torsional spring suspension common to said front and rear wheels and extending therebetween longitudinally of the vehicle structure, said torsional suspension being connected to one of said lever arms, a swingable lever arm connecting said suspension to the rear wheel, said lever arms for the front and rear wheels acting on said suspension to effect displacement of opposite ends of the vehicle structure in corresponding directions upon vertical motion of a front wheel or a rear wheel, and supplemental spring means acting alternately on said first named lever arms upon vertical motion thereof in opposite directions to modify the action of said spring suspension and provide in conjunction therewith a variable increasing spring rate at the front wheel.

9. A structure as set forth in claim 8 in which said supplemental spring means includes yieldable elements on the vehicle structure, one such element being adapted to be compressed by the lower lever arm upon upward motion thereof and another element being adapted to be compressed by the upper lever arm upon downward motion thereof.

10. A structure as set forth in claim 3 in which said compensating torsional spring means is effective to exert appreciably less spring effort than said torsional spring suspension.

11. A structure as set forth in claim 7 in which compensating spring means is connected to one of said swingable lever arms for increasing the spring resistance at one end of the vehicle structure relative to the opposite end.

12. A structure as set forth in claim 7 in which said supplemental spring means includes a yieldable means on the vehicle structure adapted to be actuated by one or the other of said upper and lower swingable lever arms.

13. In a vehicle having a vehicle structure and front and rear wheels, a spring suspension common to said front and rear wheels and extending therebetween longitudinally of the vehicle structure, separate means operatively connecting said suspension to each wheel and acting on said suspension to effect displacement of opposite ends of the vehicle structure in corresponding directions upon vertical motion of a front wheel or a rear wheel, load compensating spring means connected to one wheel and extending substantially in alignment with said spring suspension, power actuated means, and means operatively connecting said power actuated means to said load compensating spring means and acting on the latter to deflect the same thereby to vary the spring resistance at one end of the vehicle structure, said spring suspension including a torsion spring bar and said compensating spring means including an integral extension of said bar.

References Cited in the file of this patent

UNITED STATES PATENTS

| | | |
|---|---|---|
| 1,396,549 | Beatty | Nov. 8, 1921 |
| 2,103,590 | Lefevre | Dec. 28, 1937 |
| 2,191,211 | Krotz | Feb. 20, 1940 |
| 2,198,616 | Hickman | Apr. 30, 1940 |
| 2,417,214 | Roos | Mar. 11, 1947 |
| 2,563,261 | Montrose-Oster | Aug. 7, 1951 |
| 2,596,922 | Thoms | May 13, 1952 |
| 2,607,609 | Allison | Aug. 19, 1952 |
| 2,621,057 | Montrose-Oster | Dec. 9, 1952 |
| 2,621,058 | Oster | Dec. 9, 1952 |

FOREIGN PATENTS

| | | |
|---|---|---|
| 45,936 | France | Oct. 21, 1935 |
| 690,478 | Germany | Apr. 26, 1940 |